(12) United States Patent
Watanabe et al.

(10) Patent No.: US 9,584,687 B2
(45) Date of Patent: Feb. 28, 2017

(54) IMAGE PROCESSING APPARATUS, CONTROL METHOD AND RECORDING MEDIUM, TO CONTROL DISPLAY OF STATE OR SETTING INFORMATION

(71) Applicants: Genki Watanabe, Kanagawa (JP); Takashi Soyama, Kanagawa (JP); Yohsuke Utoh, Kanagawa (JP); Kazuki Yoshida, Kanagawa (JP)

(72) Inventors: Genki Watanabe, Kanagawa (JP); Takashi Soyama, Kanagawa (JP); Yohsuke Utoh, Kanagawa (JP); Kazuki Yoshida, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/726,800

(22) Filed: Jun. 1, 2015

(65) Prior Publication Data

US 2015/0358491 A1    Dec. 10, 2015

(30) Foreign Application Priority Data

Jun. 9, 2014 (JP) ................................ 2014-118959
Mar. 16, 2015 (JP) ................................ 2015-052484

(51) Int. Cl.
*G06F 3/12* (2006.01)
*H04N 1/00* (2006.01)

(52) U.S. Cl.
CPC ..... *H04N 1/00907* (2013.01); *H04N 1/00904* (2013.01)

(58) Field of Classification Search
None
See application file for complete search history.

(56) References Cited

U.S. PATENT DOCUMENTS 7,982,889 B2 * 7/2011 Okada ................ G03G 15/5004
                                                    358/1.1
8,732,497 B2 * 5/2014 Yokokura ............. G06F 1/3209
                                                    713/320

(Continued)

FOREIGN PATENT DOCUMENTS

| JP | H06-334699 | 12/1994 |
| JP | 2001-211232 | 8/2001 |
| JP | 2014-201039 | 10/2014 |

*Primary Examiner* — Marivelisse Santiago Cordero
*Assistant Examiner* — Neil R McLean
(74) *Attorney, Agent, or Firm* — Cooper & Dunham LLP

(57) ABSTRACT

An image processing apparatus includes an image processing unit configured to process an image; an input unit configured to input a start-up instruction to the image processing unit; a detection unit configured to detect that a first electric power is supplied in a case where a supply cable is connected to an electrical outlet in a state of separation of the cable from the outlet; a first non-volatile storage unit and a second volatile storage unit configured to store first and second values, respectively, the first and second values indicating whether being in a valid state for receiving the start-up instruction; a determination unit configured to determine whether the first value indicates the valid state and is different from the second value; and a control unit configured to restrict a second electric power supplied to the image processing unit, and to bring the image processing apparatus into the valid state.

8 Claims, 10 Drawing Sheets

(56) References Cited

U.S. PATENT DOCUMENTS

| | | | |
|---|---|---|---|
| 2013/0159743 A1* | 6/2013 | Inoue | H04N 1/00896 713/320 |
| 2014/0240736 A1* | 8/2014 | Tsongas | H04N 1/00896 358/1.13 |
| 2014/0300921 A1 | 10/2014 | Utoh et al. | |
| 2015/0062613 A1* | 3/2015 | Higashi | G06K 15/409 358/1.14 |

* cited by examiner

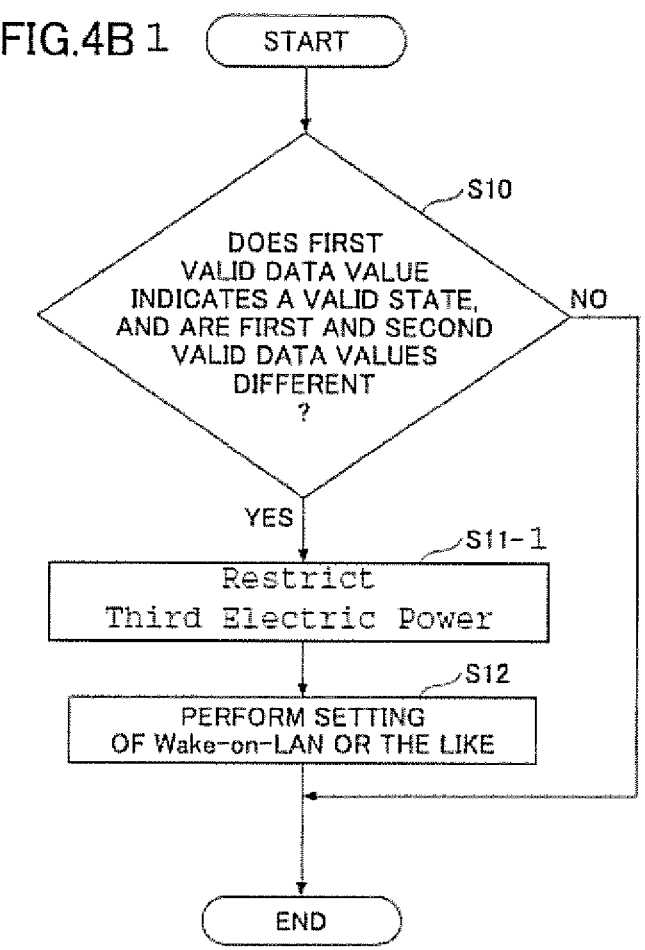

FIG.5

Img1 — 
SETTING OF Wake-on-LAN IS IN PROGRESS.

PLEASE WAIT FOR A MOMENT.

*DO NOT TURN THE MAIN POWER OFF
WHILE Wake-on-LAN IS BEING SET.

FIG.6

Img2 —
SETTING OF Wake-on-LAN IS COMPLETED.

SHUTDOWN IS IN PROGRESS.

PLEASE WAIT FOR A MOMENT.

IMAGE PROCESSING APPARATUS, CONTROL METHOD AND RECORDING MEDIUM, TO CONTROL DISPLAY OF STATE OR SETTING INFORMATION

BACKGROUND OF THE INVENTION

1. Field of the Invention

The disclosures herein generally relate to an image processing apparatus, a control method and a computer-readable recording medium storing a program for causing a computer to execute a process.

2. Description of the Related Art

Image processing apparatuses such as PCs (personal computers), which perform various processes, store various kinds of setting information used upon the processes. Moreover, as the setting information, network setting information or the like for the image processing apparatus establishing a network connection via, for example, the Ethernet (trademark registered), Wi-Fi (Wireless Fidelity) or the like is stored. Furthermore, as the setting information, for example, so-called "Wake-on-LAN" setting information or the like for permitting an other image processing apparatus, which is connected to the image processing apparatus via a LAN (Local Area Network) or the like, to remotely operate a power source of the image processing apparatus is stored.

Japanese Published Patent Application No. H06-334699, for example, discloses, as an example of using setting information related to the Wake-on-LAN function, a method of setting a time zone in which turning on a main power source by the Wake-on-LAN function is permitted.

SUMMARY OF THE INVENTION

It is a general object of at least one embodiment of the present invention to provide an image processing apparatus, a control method and a recording medium that substantially obviates one or more problems caused by the limitations and disadvantages of the related art.

In one embodiment, an image processing apparatus, which is connected to a network and processes an image, includes an image processing unit configured to perform an image processing for the image; an input unit configured to input a start-up instruction to start up the image processing unit via the network; a detection unit configured to detect that a first electric power is supplied to the image processing apparatus in a case where a supply cable, which supplies the first electric power to the image processing apparatus, is connected to an electrical outlet in a state that the supply cable is separated from the electrical outlet; a first storage unit, which is non-volatile, configured to store a first valid data indicating whether being in a valid state which is a state of capable of accepting the start-up instruction; a second storage unit, which is volatile, configured to store a second valid data indicating whether being in the valid state; a determination unit configured to perform determination whether the first valid data is a data which indicates the valid state and determination whether the first valid data and the second valid data are different from each other upon detecting by the detection unit that the first electric power is supplied; and a control unit configured to restrict a second electric power of the first electric power being supplied to the image processing unit, in a case where the first valid data is determined to be a data which indicates the valid state and the first valid data and the second valid data are determined to be different from each other, to perform settings so as to bring into the valid state upon the second electric power being restricted, and to bring into the valid state.

In another embodiment, a control method is performed by an image processing apparatus, which is connected to a network and includes an image processing unit for performing an image processing for an image, a first storage unit, which is non-volatile, and a second storage unit, which is volatile. The method includes inputting, by the image processing apparatus, a start-up instruction to start up the image processing unit via the network; detecting, by the image processing apparatus, that a first electric power is supplied to the image processing apparatus in a case where a supply cable, which supplies the first electric power to the image processing apparatus, is connected to an electrical outlet in a state that the supply cable is separated from the electrical outlet; storing, by the image processing apparatus, a first valid data indicating whether being in a valid state which is a state of capable of accepting the start-up instruction in the first storage unit; storing, by the image processing apparatus, a second valid data indicating whether being in the valid state in the second storage unit; performing, by the image processing apparatus, determination whether the first valid data is a data which indicates the valid state and determination whether the first valid data and the second valid data are different from each other upon detecting that the first electric power is supplied; and restricting, by the image processing apparatus, a second electric power of the first electric power being supplied to the image processing unit, in a case where the first valid data is determined to be a data which indicates the valid state and the first valid data and the second valid data are determined to be different from each other, performing settings so as to bring into the valid state upon the second electric power being restricted, and bringing into the valid state.

In yet another embodiment, a non-transitory computer-readable storage medium stores a program for causing a computer connected to a network and including an image processing unit for performing an image processing for an image, a first storage unit, which is non-volatile, and a second storage unit, which is volatile, to execute control. The process includes an input step, by the computer, of inputting a start-up instruction to start up the image processing unit via the network; a detection step, by the computer, of detecting that a first electric power is supplied to the computer in a case where a supply cable, which supplies the first electric power to the image processing apparatus, is connected to an electrical outlet in a state that the supply cable is separated from the electrical outlet; a first storage step, by the computer, of storing a first valid data indicating whether being in a valid state which is a state of capable of accepting the start-up instruction in the first storage unit; a second storage step, by the computer, of storing a second valid data indicating whether being in the valid state in the second storage unit; a determination step, by the computer, of performing determination whether the first valid data is a data which indicates the valid state, and determination whether the first valid data and the second valid data are different from each other upon detecting that the first electric power is supplied; and a control step, by the computer, of restricting a second electric power of the first electric power being supplied to the image processing unit, in a case where the first valid data is determined to be a data which indicates the valid state and the first valid data and the second valid data are determined to be different from each other, performing settings so as to bring into the valid state upon the second electric power being restricted, and bringing into the valid state.

According to the embodiment of the present application, power consumption related to settings of Wake-on-LAN or the like can be reduced.

BRIEF DESCRIPTION OF THE DRAWINGS

Other objects and further features of embodiments will be apparent from the following detailed description when read in conjunction with the accompanying drawings, in which:

FIG. 4B1 is a flowchart illustrating an example of a process that can be performed by an image processing apparatus (e.g., as shown in FIG. 2), according to an another embodiment;

FIG. 5 is a diagram illustrating an example of a first screen displayed by the image processing apparatus according to the present embodiment;

FIG. 6 is a diagram illustrating an example of a second screen displayed by the image processing apparatus according to the present embodiment;

DESCRIPTION OF THE PREFERRED EMBODIMENTS

In the following, embodiments of the present invention will be described with reference to the accompanying drawings.

Example of the Entire Configuration

Figure 1:
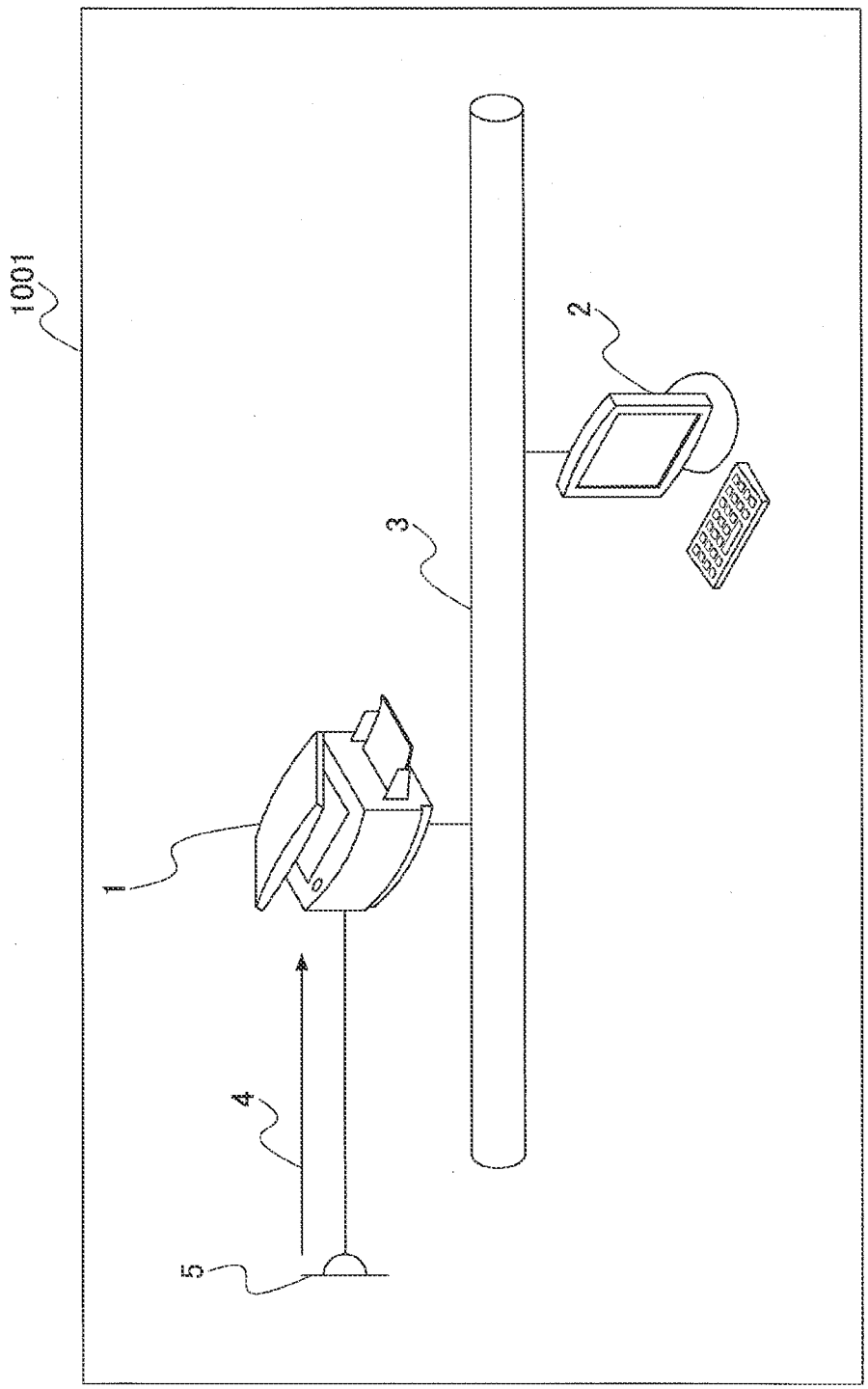
FIG. 1 is configuration diagram illustrating an example of an entire image processing system including an image processing apparatus according to a present embodiment.

FIG. 1 is a configuration diagram illustrating an example of an entire image processing system including an image processing apparatus according to a present embodiment. Specifically, the image processing system 1001 includes the image processing apparatus 1 according to the present embodiment, and the image processing apparatus 1 is connected to a network 3. Furthermore, to the network 3, for example, an information processing apparatus, such as a personal computer (PC) 2 or the like, is connected.

In the image processing system 1001, for example, a user operates the PC 2 to cause to PC 2 to generate image data, which causes the image processing apparatus 1 to perform image formation of a document, an image or the like. Next, upon the image data being sent to the image processing apparatus via the network 3, the image processing apparatus 1 performs various image processes based on the image data, and forms an image on a paper or the like.

Moreover, in the image processing system 1001, when the image processing apparatus 1 is connected to an electrical outlet 5 by a supply cable, electric power (hereinafter referred to as "first electric power") 4 is supplied to the image processing apparatus 1 from the electrical outlet 5 via the supply cable, and the image processing apparatus 1 performs various processes, such as image processing.

Example of Hardware Configuration

Figure 2:
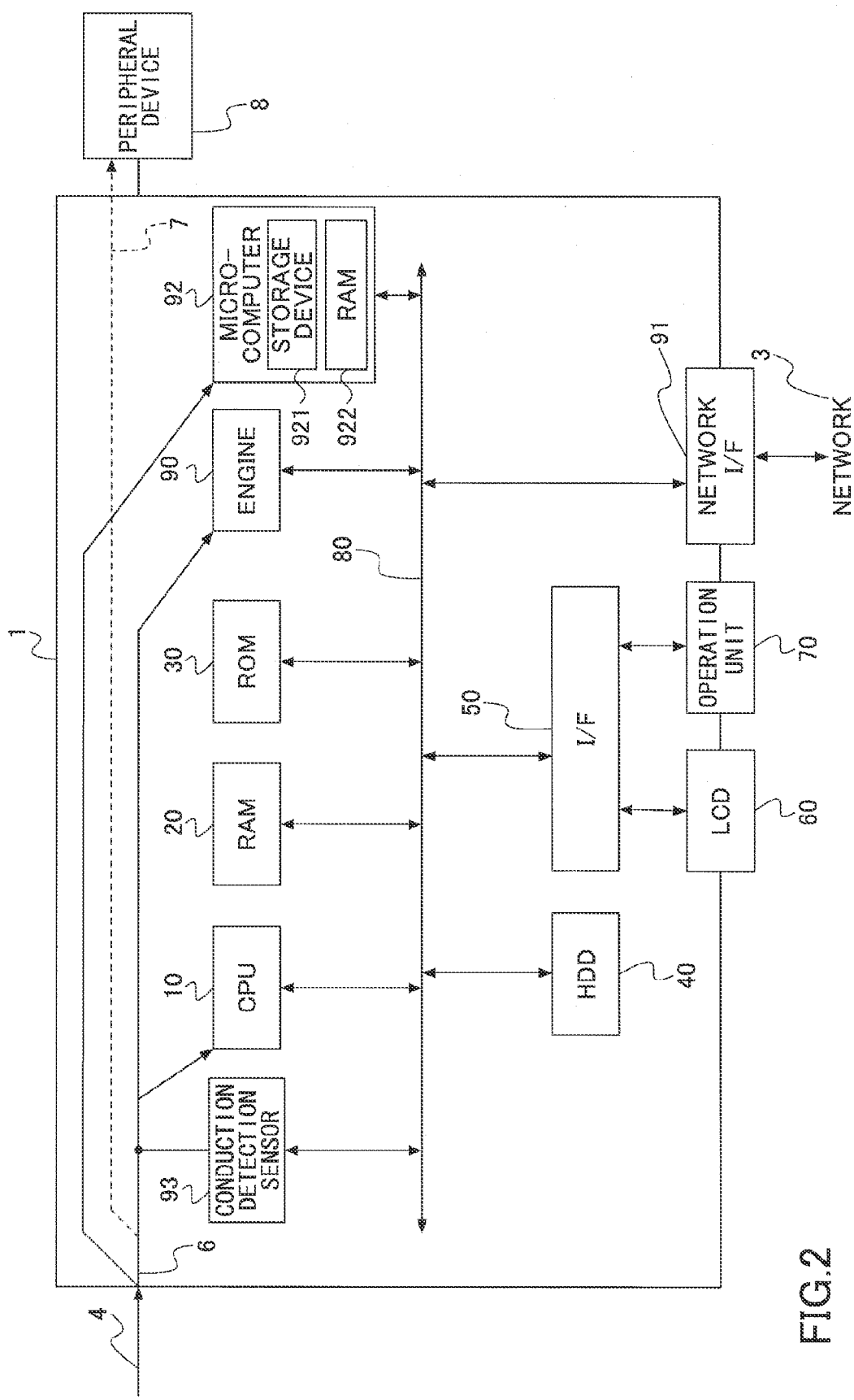
FIG. 2 is a block diagram illustrating an example of a hardware configuration of the image processing apparatus according to the present embodiment.

FIG. 2 is a block diagram illustrating an example of a hardware configuration of the image processing apparatus according to the present embodiment. Specifically, the image processing apparatus 1 is a multifunction peripheral (MFP), which can be used as a printer, a facsimile machine, a scanner or a copier, or the like.

The image processing apparatus 1 includes, for example, a CPU (Central Processing Unit) 10, a RAM (Random Access Memory) 20, a ROM (Read-Only Memory) 30, an HDD (Hard Disk Drive) 40, an interface (I/F) 50, an engine 90, a network I/F 91 and a microcomputer 92. Moreover, the respective hardware included in the image processing apparatus 1 is connected to a bus 80. Furthermore, to the I/F 50, an LCD (Liquid Crystal Display) 60, an operation unit 70 and the like are connected. Furthermore, the image processing apparatus 1 includes a conduction detection sensor 93.

The CPU 10 is an arithmetic device for performing various processes to be performed in the image processing apparatus 1 and processing of various data, and a control device for controlling respective hardware or the like included in the image processing apparatus 1. Meanwhile, the image processing apparatus 1 may further include an arithmetic device or a control device for assisting the CPU 10.

The RAM 20 is a so-called "memory" or the like. Moreover, the RAM 20 is a volatile storage device for storing a program, data and the like used by the CPU 10 or the like. The RAM 20 is used as a work area by the CPU 10.

The ROM 30 is a so-called "memory" or the like. Moreover, the ROM 30 is a non-volatile storage device for storing a program, such as firmware, data and the like used by the CPU 10 or the like.

The HDD 40 is so-called "auxiliary storage device". Moreover, the HDD 40 is provided with a storage region, such as an HD (Hard Disk). The storage region stores an OS (Operating system), various control programs, application programs, and the like.

The I/F (interface) 50 includes, for example, a connector, integrated circuits (IC) for processing and the like. Moreover, the I/F 50 causes the LCD 60, the operation unit 70 and the like to connect to the image processing apparatus 1, respectively.

The LCD 60 is a visual user interface for the user observing a state of the image processing apparatus 1 or the like. That is, the LCD 60 is an example of an output device.

The operation unit 70 is, for example, a keyboard, a mouse and the like. Moreover, the operation unit 70 is a user interface for the user inputting an operation, such as an instruction or a setting, to the image processing apparatus 1. That is, the operation unit 70 is an example of an input device.

Meanwhile, the LCD 60 and the operation unit 70 may be hardware, such as a touch panel display, in which an input device and an output device are integrated.

The engine 90 performs image processing based on an instruction or the like input to the image processing apparatus 1 from an external apparatus, such as a PC 2 (See FIG. 1), via the network 3, from the operation unit 70 or the like. For example, upon image data being input from the PC 2 via the network 3, the engine 90 performs image formation of an image represented by the image data on a paper or the like. Specifically, the engine 90 performs image processing to process the input image data, performs the processes of charging, exposure, developing, transfer, fixing, cleaning and the like, and thereby the engine 90 performs image formation of an image on a paper or the like.

The network I/F 91 includes, for example, a connector, a processing IC and the like. Moreover, the network I/F 91 connects the image processing apparatus 1 to the network 3. The network I/F 91 sends/receives data to/from an external apparatus, such as the PC 2 connected to the network 3.

The microcomputer 92 is a control device for controlling hardware included in the image processing apparatus 1. For example, the microcomputer 92 controls the CPU 10 and the engine 90, respectively, to perform a control for restricting a second electric power 6 or the like and to perform a control for supplying the second electric power 6 or the like. Moreover, the microcomputer 92 includes a storage device 921 and a RAM 922.

The storage device 921 is, for example, a NAND-type flash memory or the like. That is, the storage device 921 is a non-volatile storage element. Therefore, even when the supply of the first electric power 4 is disrupted due to a power outage, a temporary blackout, separation of the supply cable from the electrical outlet or the like (hereinafter referred to as a "power outage or the like"), data stored in the storage device 921 are maintained.

The RAM is a volatile storage element. Therefore, when the supply of the first electric power 4 is disrupted due to a power outage or the like, data stored in the RAM 922 are erased. The data are initialized upon starting, for example, and initial values are set.

The image processing apparatus 1 reads out a program stored in a recording medium, such as the ROM 30, the HDD 40 or an optical disk, for example, and loads it into the RAM 20. Next, the image processing apparatus 1, by the CPU 10 performs arithmetic processing based on the program loaded into the RAM 20, realizing a software control unit. Accordingly, the image processing apparatus 1 realizes a function of the image processing apparatus 1 according to the present embodiment by a combination of the software control unit and the hardware.

The conduction detection sensor 93 includes a sensor for detecting whether the supply cable for supplying the first electric power 4 or the like is conducted, by an electronic circuit and the like. For example, in a case where the image processing apparatus 1 is connected to the electric outlet 5 (See FIG. 1) via the supply cable or in a case where electric power is recovered from a power outage or the like, the conduction detection sensor 93 detects that the first electric power 4 is supplied to the image processing apparatus 1. On the other hand, in a case of a power outage or the like, the conduction detection sensor 93 may detect that the first electric power 4 is not supplied to the image processing apparatus 1.

Meanwhile, electric power of the first electric power 4 supplied to the image processing apparatus 1, which is thereby supplied to the engine 90 and the CPU 10, is referred to as the "second electric power" 6.

Moreover, to the image processing apparatus 1, a stapler for stapling papers or the like or a puncher or the like for performing hole punching for a paper or the like may be connected as a peripheral device 8. Moreover, a finisher or the like for performing bookbinding for papers or the like, for folding a paper or the like, for sorting or the like may be connected to the image processing apparatus 1. Meanwhile, in a case where the peripheral device 8 is connected to the image processing apparatus, electric power of the first electric power 4 supplied to the image processing apparatus 1, which thereby is supplied to the peripheral device 8 is referred to as a "third electric power" 7.

Example of Configuration of Program

Figure 3:
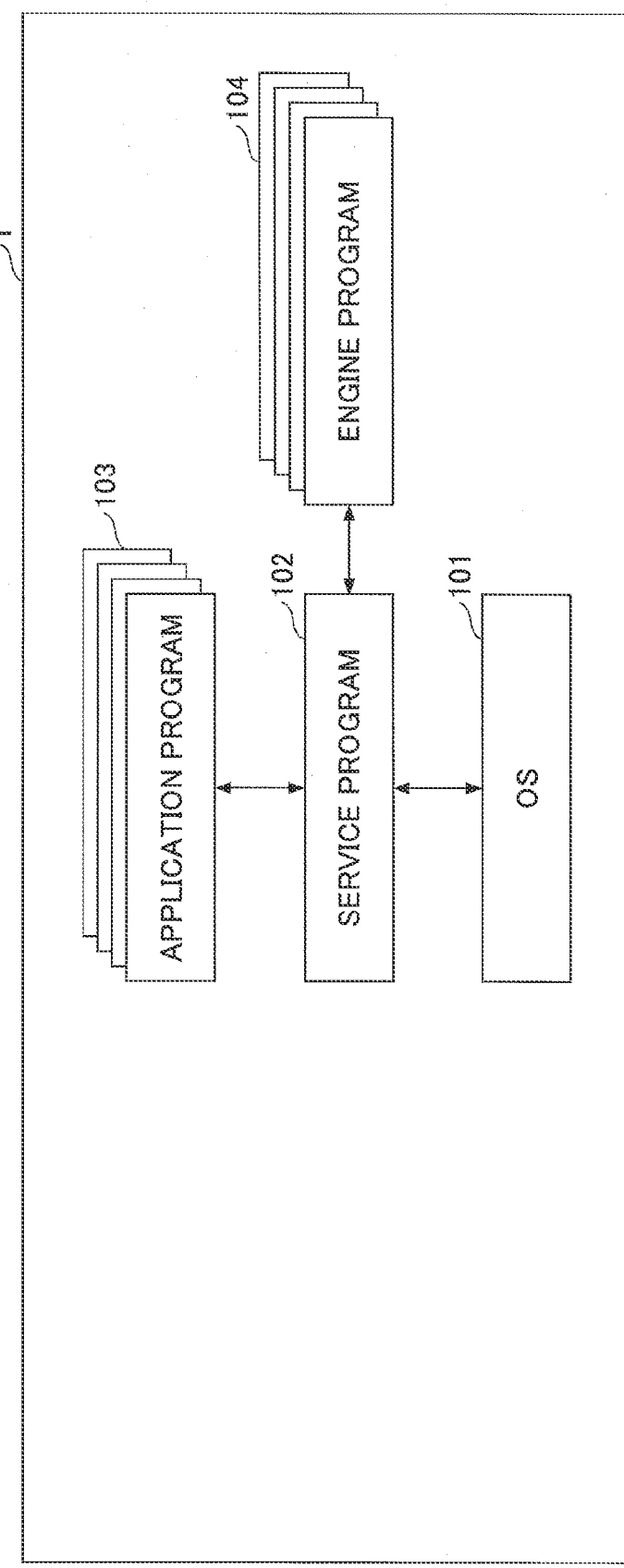
FIG. 3 is a block diagram illustrating an example of a program used by the image processing apparatus according to the present embodiment.

FIG. 3 is a block diagram illustrating an example of a program used by the image processing apparatus according to the present embodiment. Specifically, the program used by the image processing apparatus 1 includes an OS (operating system) 101, a service program 102, an application program 103, an engine program 104 and the like.

The OS 101 is basic software for controlling the entirety of the image processing apparatus 1. Specifically, for example, in a case where a power switch provided on the image processing apparatus 1 is pressed by a user, or the like, the OS 101 receives an instruction to perform start-up from the microcomputer 92 (See FIG. 2) or the like, and turns on an electric source of the engine 90 (See FIG. 2). Moreover, the OS 101 receives an instruction from the microcomputer 92 or the like, and starts up the service program 102. That is, the OS 101 functions as an instruction output unit.

Moreover, in case where information indicating initializing the setting information (hereinafter referred to as "setting instruction information") is output along with the instruction from the microcomputer 92, the OS 101 then outputs to the service program 102 an instruction to perform start-up along with the setting instruction information.

The setting information is used for executing the image processing apparatus 1 processes. The OS 101 performs various settings by using the setting information. Specifically, the setting information includes, for example, network setting information or the like for connecting the image processing apparatus 1 to a network via the Ethernet (trademark registered), Wi-Fi (Wireless Fidelity) and the like. Moreover, the setting information includes, Wake-on-LAN setting information for permitting an other information processing apparatus or the like, which is connected via the network 3 (See FIG. 1) or the like, to operate a power source of the image processing apparatus 1.

The setting information is, for example, stored in a database which can be referenced by the OS 101 (for example, a registry in Windows (trademark registered). However, in a case of a temporary blackout or a reduction of power of the first electric power 4 (See FIG. 2), or in a case where the image processing apparatus 1 is separated from an electrical output (See FIG. 1), the setting information may be initialized or may be erased. For example, in a case where the setting information is initialized or erased, the user turns on the electric source of the image processing apparatus 1 in order to set the setting information again and inputs the setting information and then turns off the electric source of the image processing apparatus 1.

As described above, in order to set the setting information, for example, when the electric source of the image processing apparatus 1 is turned on, the setting instruction information is output along with instructions to perform start-up, in a case where a setting mode transition signal is generated by key operations or the like by a keyboard.

Meanwhile, as described in the present embodiment, an example in which the setting instruction information is output along with instructions to perform start-up, is explained. However, the setting instruction information may be in a mode in which the OS 101 and the service program 102 can recognize the setting instruction information, respectively. For example, the setting instruction information may be included in or added to the instructions to perform start-up.

In this way, a summary of the present embodiment is a process in the image processing apparatus 1 when the instructions to perform start-up use output along with the setting instruction information in a case where the electric source of the image processing apparatus 1 is turned on.

Moreover, the OS 101 transitions to a setting mode in a case where the key operations or the like are performed by a keyboard along with turning on an electric source as described above. For example, in the setting mode, the OS 101 receives a setting operation from the user, and sets the setting information. Furthermore, upon completing the setting of the setting information, the OS 101 reports completion of the setting of the setting information to the service program 102. Moreover, the OS 101, upon receiving a shutdown instruction according to the user's operation, outputs a shutdown request to the service program 102.

The service program 102 is an example of a software module which is configured when a program is installed in the image processing apparatus 1. Specifically, the service program 102, upon receiving an instruction from the OS 101, outputs the instructions to perform start-up, a shutdown request and the like to each of the application program 103 and the engine program 104. Moreover, the service program 102 performs processing depending on whether the instructions to perform start-up are output from the above-described OS 101 along with the setting instruction information.

The application program 103 is an example of a software module which is configured when a program is installed in the image processing apparatus 1. Specifically, the application program 103 is, for example, word-processing software, spreadsheet software, image-editing software or the like. Moreover, the application program 103 performs start-up processes in response to the instructions to perform start-up from the service program 102, and performs shutdown processes (stoppage of electric power supply) in response to the shutdown request from the service program 102.

The engine program 104 is an example of a software module for driving the engine 90 (See FIG. 2), and is configured by a corresponding program installed in the image processing apparatus 1. Moreover, the engine program 104 performs start-up processes for the engine 90 in response to the instructions to perform start-up from the service program 102. Furthermore, the engine program 104 performs a shutdown request from a corresponding engine 90 in response to the shutdown request from the service program 102.

Meanwhile, when the OS 101, the service program 102, the application program 103 and the engine program 104 are executed, the CPU 10 performs various processes in order to perform all of or a part of each of the processes. Moreover, the various processes may be performed by diversifying or making redundant all of or a part of the processes of an arithmetic device included in the engine 90 or by the microcomputer 92.

Example of the Entire Process

Figure 4B:
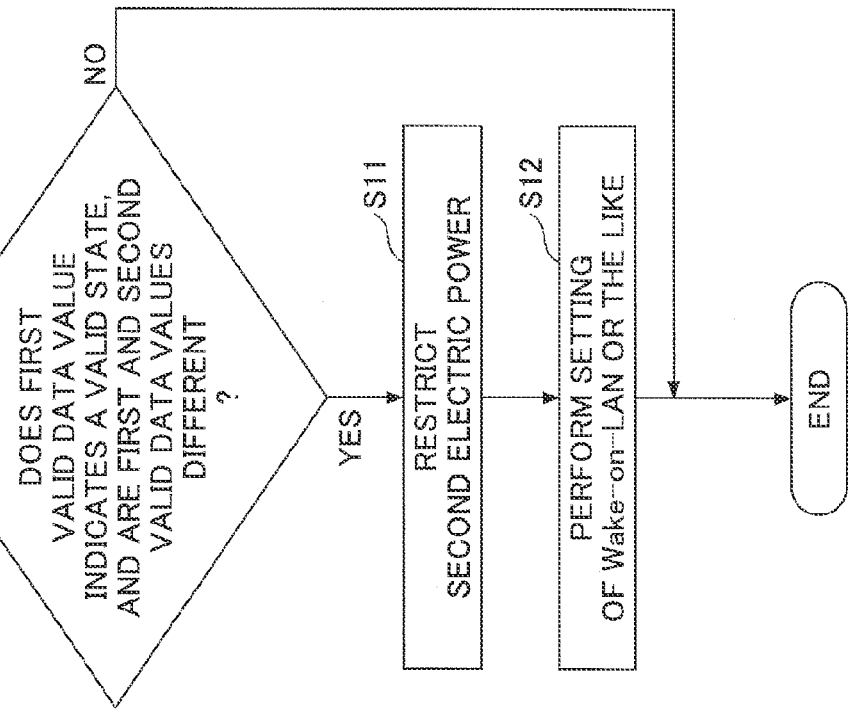
FIGS. 4A and 4B are flowcharts illustrating an example of entire processes of the image processing apparatus according to the present embodiment.
Figure 4A:
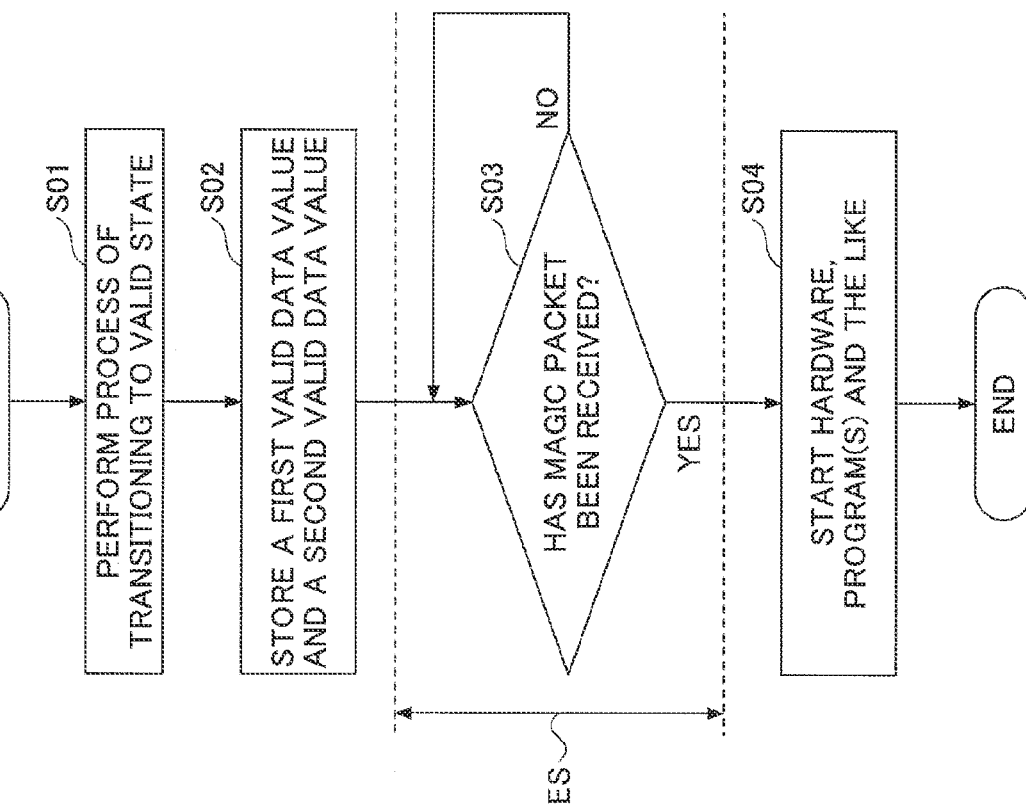

FIGS. 4A and 4B are flowcharts illustrating an example of entire processes of the image processing apparatus according to the present embodiment. First, the image processing apparatus performs processing shown in FIG. 4A.

Example of Process to Transition to Valid State (Step S01)

In step S01, the microcomputer 92 (See FIG. 2) performs a process to transition to a state that can receive a start-up instruction (hereinafter referred to as a "valid state"). Meanwhile, the start-up instruction is a magic packet or the like which is input via the network 3 (See FIG. 1) and causes the engine 90 (See FIG. 2) or the like to start. Specifically, first, in step S01, the microcomputer 92 inputs data values related to various settings. Meanwhile, the various settings are input by a user or the like from the PC 2 (See FIG. 1) or the like or the operation unit 70 (See FIG. 2) via the network 3. Next, in step S01, the microcomputer 92 puts the image processing apparatus into the valid state based on the setting which is input. That is, in the valid state, the image processing apparatus can be operated according to the wake-on-LAN from the PC 2 or the like via the network 3. In the following, an example where the start-up instruction is a magic packet will be explained. Moreover, an example where the image processing apparatus receives a magic packet by the network I/F 91 (See FIG. 2) or the like will be explained.

For example, in a case where the image processing apparatus is in the valid state, when the magic packet is received by the image processing apparatus, the image processing apparatus performs start-up of the engine 90 or the like in order to perform image processing or the like. Meanwhile, the magic packet may be a start-up instruction for the hardware or a function other than the engine 90 included in the image processing apparatus. Moreover, upon receiving the magic packet, the second electric power is supplied to the hardware for start up.

In the valid state, the microcomputer 92 controls electric power supplied to each of the microcomputer 92, the network I/F 91 and the like which are among the hardware included for receiving the magic packet in the image processing apparatus.

On the other hand, in the valid state, power consumption of the image processing apparatus is preferably small. Therefore, in the valid state, the microcomputer 92 may restrict the second electric power 6 being supplied to the engine 90, the CPU 10 (See FIG. 2) and the like. That is, the valid state is preferably a state where the image processing apparatus is shut down.

Example of Storing a First Valid Data Value and a Second Valid Data Value (Step S02)

In step S02, the microcomputer 92 stores each of a first valid data value and a second valid data value.

Here, each of the first valid data value and the second valid data value indicates whether the image processing apparatus is in a valid state. For example, the first valid data value and the second valid data value are so-called "flag" data values. Each of the first valid data value and the second valid data value becomes "1", in a case where step S01 or the like is performed and the image processing apparatus enters a valid state. On the other hand in a case where the image processing apparatus is not in the valid state, each of the first valid data value and the second valid data value is "0". In the following, an example where the first valid data value and the second valid data value are flag data values, respectively, will be explained. Moreover, default values of the first valid data value and the second valid data value are "0", respectively.

The first valid data value and the second valid data value are stored, for example, in the storage device 921 (See FIG. 2) which is an example of the first storage unit and in the RAM 922 (See FIG. 2) which is an example of the second storage unit, respectively. Data values stored in the storage device 921 are referred to as "first valid data values", and data values stored in the RAM 922 are referred to as "second valid data values". Meanwhile, the first valid data value and the second valid data value are, for example, updated simultaneously, and store the same value. In the following, an example where the first valid data value and the second valid data value store the same value simultaneously will be explained. However, the first valid data value and the second valid data value may not be updated simultaneously.

Example of Determining Whether to Receive a Magic Packet (Step S03)

In step S03, the microcomputer 92 determines whether to receive a magic packet by the network I/F 91. Specifically, in a case where the image processing apparatus is in the valid state, upon receiving the magic packet from the PC 2 (See FIG. 1) or the like via the network 3 (See FIG. 1) (step S03: YES), the process of the microcomputer 92 proceeds to step S04. On the other hand, in a case of not receiving the magic packet from the network 3 (step S03: NO), the process of the microcomputer 92 repeats step S03. That is, the image processing apparatus waits for receiving a magic packet by step S03.

Example of Start-Up of Hardware, Program(s) and the Like (Step S04)

In step S04, the microcomputer 92 starts up the hardware, a program and the like. That is, in step S04, in order to perform image processing and preparation for image processing, the microcomputer 92 starts up the engine 90 (See FIG. 2), which is used for image processing and the preparation for the image processing, the application program 103 (See FIG. 3), the engine program 104 (See FIG. 3) or the like. Meanwhile, in a case where the process in step S04 is performed and, it is not in the valid state ES, the first valid data value and the second valid data value which were set to "1" in step S02, are updated to "0", respectively.

Meanwhile, in FIG. 4A, the valid state ES is, for example, the state where the process in step S03 is performed. That is, the valid state ES is a state waiting for the reception of the magic packet via the network 3. Specifically, upon receiving the magic packet in the valid state ES, the microcomputer 92, according to step S04, can start up the hardware, the program(s) and the like included in the image processing apparatus.

Next, in a case where a supply cable is connected to an electrical outlet and the first electric power 4 (See FIG. 2) is supplied, the image processing apparatus performs the process shown in FIG. 4B. That is, the process shown in FIG. 4B is a process performed upon the supply cable being connected to an electrical outlet or the like. For example, due to a power outage or the like, voltage of the first electric power 4 may be decreased or the first electric power 4 supplied to the image processing apparatus 1 may be disrupted. Afterwards, when electric power is recovered and the supply cable is connected to an electrical outlet, the first electric power 4 which has a predetermined electric power and voltage determined according to a specification, is supplied to the image processing apparatus 1 and the image processing apparatus 1 starts the process shown in FIG. 4B. Or, for example, in a case where a power outage or the like occurs in a state where a supply cable is connected to the electrical outlet, and afterwards, when electric power is recovered so that the first electric power 4 with a predetermined electric power and voltage determined according to a specification, is supplied to the image processing apparatus 1, the image processing apparatus 1 starts the process shown in FIG. 4B. Meanwhile, each of the power outage and the connection of the supply cable can be detected by the conduction detection sensor 93.

Moreover, since the RAM 922 (See FIG. 2) is a volatile memory, the second valid data value is erased by a power outage or the like. Next, upon the image processing apparatus 1 starting the process shown in FIG. 4B, the image processing apparatus performs initialization for setting the second valid data value to the default value of "0".

Example of Determining Whether a First Valid Data Value Indicates a Valid State and Whether a First Valid Data Value and a Second Valid Data Value are Different (Step S10)

In step S10, at first, the microcomputer 92 determines whether the first valid data value indicates a valid state. Specifically, in a case where the first valid data value is "1", the microcomputer 92 determines that the first valid data value indicates the valid state. Moreover, in a case where it is determined that the first valid data value indicates the valid state, next, the microcomputer 92 determines whether the first valid data value and the second valid data value are different from each other.

In a case where it is determined that the first valid data value indicates a valid state and the first valid data value and the second valid data value are different from each other (step S10: YES), the process of the microcomputer 92 proceeds to step S11. On the other hand, in a case where the first valid data value is not "1" (step S10: NO), the microcomputer 92 ends the process. Similarly, even when the first valid data value is "1", in a case where the first valid data value and the second valid data value are not different from each other (step S10: NO), the microcomputer 92 ends the process.

Meanwhile, in a case where in the valid state ES (See FIG. 4A) a power outage or the like occurs, the first valid data value is "1" according to step S02. On the other hand, the second valid data value is "0" because of the initialization. Accordingly, the microcomputer determines that the first valid data value indicates a valid state and the first valid data value and the second valid data value are different from each other (step S10: YES). On the other hand, in a case where the shutdown is performed without performing the setting of the Wake-on-LAN, a value of "0" is stored in the first valid data value. Therefore, the microcomputer 92 determines that the first valid data value does not indicate a valid state (step S10: NO).

Example of Restricting a Second Electric Power (Step S11)

In step S11, the microcomputer 92 restricts the second electric power. Specifically, in step S11, the microcomputer 92 restricts electric power supplied to hardware other than the hardware which is used in step S12 in the latter stage.

For example, in step S11, the microcomputer 92 restricts the second electric power 6 (See FIG. 2) supplied to the engine 90 (See FIG. 2). That is, in step S11, the microcomputer 92 disrupts or decreases electric power supplied to the engine 90, and thereby reduces the second electric power 6 consumed by the engine 90.

Moreover, in step S11, the microcomputer 92 may restrict electric power supplied to the engine 90 by controlling a program used by the engine 90 for the image processing or the preparation for the image processing to be stopped. That is, in step S11, the microcomputer 92 may restrict the electric power supplied to the engine 90 by stopping or interrupting the execution of the engine program 104 (See FIG. 3) which starts up the engine 90. Meanwhile, restriction of the electric power to be supplied is a process for reducing electric power consumed by the hardware such as the engine 90. Specifically, the restriction of electric power to be supplied is a control performed such as stopping the intended hardware, putting the hardware into an energy-saving mode, not starting up the hardware, decreasing electric power to be supplied or the like. Meanwhile, processing related to the restriction of the electric power to be supplied may be performed through the OS 101 (See FIG. 3).

The engine 90 often includes a device, such as a fixing device, having a large power consumption in order to perform various imaging process. Therefore, the engine 90 often requires a large amount of power consumption for start-up, execution of image processing, preparation for the image processing and the like. For this reason, by the microcomputer 92 restricting the second electric power 6 to be supplied to the engine 90, in step S11, the image processing apparatus can reduce power consumption related to setting of the Wake-on-LAN or the like.

Moreover, in a case of connecting the peripheral device 8 (See FIG. 2) to the image processing apparatus, in step S11-1 (See FIG. 4B1), the microcomputer 92 may restrict the third electric power 7 (See FIG. 2) being supplied to the peripheral device 8.

Since the peripheral device 8 is not used often for the setting of the Wake-on-LAN or the like, the image processing apparatus can reduce the power consumption related to the setting of the Wake-on-LAN or the like by restricting the third electric power 7 in step S11.

Moreover, the restriction of the electric power to be supplied related in step S11 may be a control such as stopping or interrupting a program used by the CPU 10 or the like or by not starting up the program, in order to reduce electric power consumed in the CPU 10 or the like. Specifically, the microcomputer 92 restricts the second electric power 6 being supplied to the CPU 10, by restricting execution of the service program 102 (See FIG. 3), the application program 103 (See FIG. 3) or the like.

The image processing apparatus often performs processing based on a program, a so-called "start-up", upon the first electric power 4 (See FIG. 2) being supplied to the image processing apparatus. Specifically, the program executes, for example, a process of acquiring or initializing parameters or the like used for image processing or the like (hereinafter referred to as a "first program"). Furthermore, the program may execute a process of displaying a screen or the like (hereinafter referred to as a "second program").

That is, in step S11, the microcomputer 92 may execute processing based on the first program and the second program as a start-up for the preparation of the image processing apparatus performing image processing or the like.

For example, the image processing apparatus may include a scanner. In this case, the image processing apparatus performs image processing for optically reading out an image by the scanner and generating image data. Then, the image processing apparatus, upon generating the image data, may send the image data to an information processing apparatus such as a PC 2 (See FIG. 1) or the like via the network 3.

In this case, the first program causes the CPU 10 or the like to execute a process of reading out data from the HDD 40 (See FIG. 2), an other storage device or the like, and initializing parameters. Meanwhile, the first program may cause the CPU 10 or the like to execute a process of reading out data from an external information processing apparatus or the like via the network 3, and initializing parameters. Moreover, the data may be, for example, data of a so-called "address book" including an address or the like for specifying a destination of the image data. Meanwhile, the data may be parameters used in various processes related to image formation.

Moreover, the image processing apparatus may display, for example, a setting screen for causing a user to operate a setting related to copying, by the LCD 60 (See FIG. 2). Meanwhile, in the screen displayed by the LCD 60, a generated image showing a logo or the like may be displayed for indicating that the image processing apparatus is in a startup state. In this case, the second program causes the CPU 10 to execute a process of generating an image for displaying the logo or the setting screen. That is, when the second program is executed, the CPU 10 executes the process of generating the image indicating the logo, the setting screen or the like based on the program.

Upon the execution of the first program and the second program, the CPU 10 performs various processes based on the programs, and electric power consumed by the CPU 10 is often large. Therefore, the microcomputer 92 can reduce the second electric power 6 (See FIG. 2) consumed by the CPU 10, by restricting the execution of the first program or the second program.

Moreover, in a case of restricting the execution of the first program or the second program, the microcomputer 92 can reduce processing by performing a shutdown of the first program and/or the second program in step S12 in the latter stage. Then, a time period for the first program and the second program performing a shutdown in the image processing apparatus can be shortened. Therefore, a time from the start of the process in step S12 until the image processing apparatus enters the valid state ES (See FIG. 4A) can be shortened.

Example of a Process Such as Setting of Wake-on-LAN (Step S12)

In step S12, the microcomputer 92 performs setting or the like of the Wake-on-LAN. Specifically, in step S12, the setting or the like of the Wake-on-LAN is performed and the image processing apparatus enters the valid state ES. Meanwhile, in step S12, for example, in a case where the setting of the Wake-on-LAN is completed, the microcomputer 92 may further perform the process in step S02.

Meanwhile, in step S12, a screen showing that the second electric power 6 (See FIG. 2) supplied to the engine 90 is restricted by the process in step S11 may be displayed.

FIG. 5 is a diagram illustrating an example of a first screen displayed by the image processing apparatus according to the present embodiment. Specifically, a screen displayed in step S12 (See FIG. 4B) is, for example, the first screen Img1.

The first screen Img1 shows, for example, a user that the image processing apparatus is in a state of performing a process of setting the Wake-on-LAN by the process in step S12. Moreover, the first screen Img1 prohibits the user from performing an operation of turning off electric power supply or the like. Furthermore, a screen displayed in step S12 may be different from the first screen Img1 depending on the state of the image processing apparatus.

FIG. 6 is a diagram illustrating an example of a second screen displayed by the image processing apparatus according to the present embodiment. Specifically, in a case where the setting of the Wake-on-LAN in step S12 is completed and the image processing apparatus enters the valid state ES (See FIG. 4A), a displayed screen is, for example, the second screen Img2.

Since the first screen Img1 and the second screen Img2 are displayed for the user, respectively, the user can recognize the state of the image processing apparatus. Moreover, since the first screen Img1 and the second screen Img2 prohibit the user from performing an operation of turning off electric power supply or the like, the image processing apparatus in a state of performing a process of setting the Wake-on-LAN is less likely turned off by a user's operation. If the image processing apparatus is turned off in a state of performing the process of setting the Wake-on-LAN, the hardware included in the image processing apparatus is often damaged. Accordingly, the image processing apparatus displays the first screen Img1 or the second screen Img2 which prohibits the user from performing an operation of turning off electric power supply or the like, and occurrences of failures in the image processing apparatus can be suppressed.

Moreover, the screen displayed in step S12 may receive an instruction to supply the second electric power 6 to the engine 90 or the like.

Figure 7:
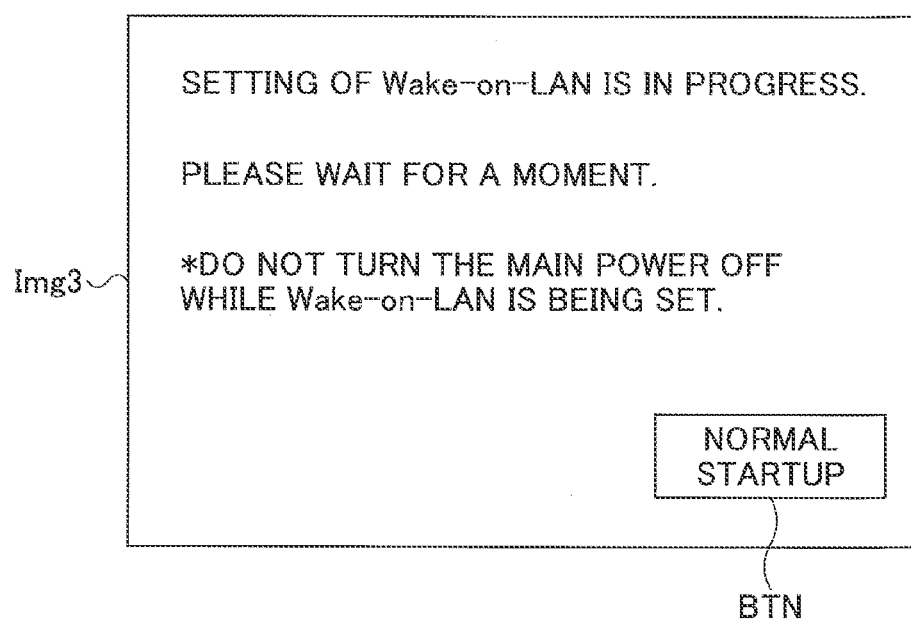
FIG. 7 is a diagram illustrating an example of a third screen displayed by the image processing apparatus according to the present embodiment.

FIG. 7 is a diagram illustrating an example of a third screen displayed by the image processing apparatus according to the present embodiment. Specifically, the screen displayed in step S12 is, for example, the third screen Img3. The third screen Img3 is, as shown in FIG. 7, configured by adding an operation button BTN, for inputting an instruction to supply the second electric power 6, to the first screen Img1, as shown in FIG. 5. That is, the operation button BTN is an example of a graphical user interface (GUI) for inputting an operation by a user.

Upon the operation button BTN being pressed on the third screen Img3 by the user, the microcomputer 92 performs a start-up of hardware, a program(s) and the like. That is, the user can interrupt the process in step S12 by the image processing apparatus by the operation button BTN, and thereby the image processing apparatus is switched to a state where image formation such as copying can be performed.

Figure 8:
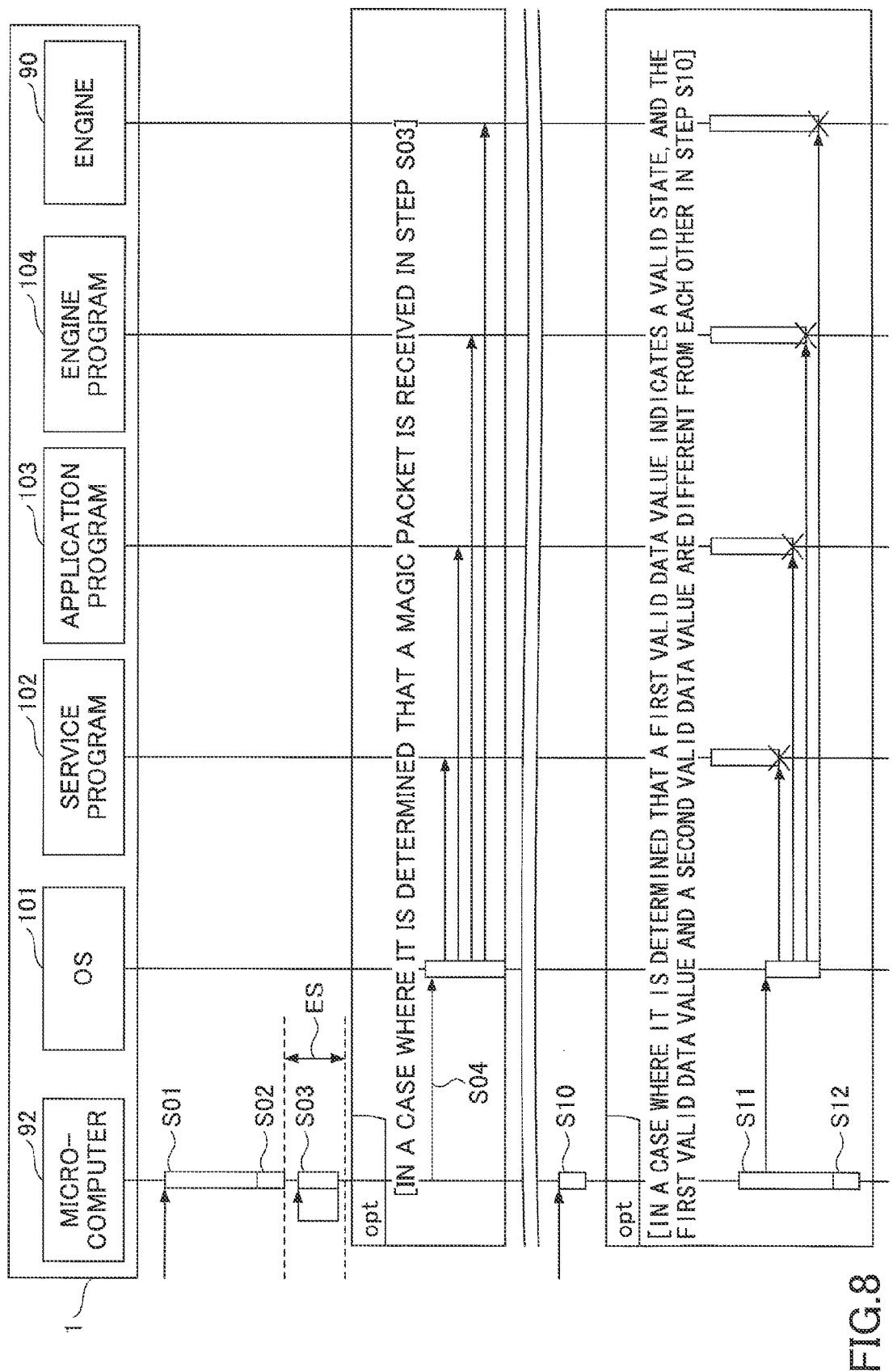
FIG. 8 is a sequence diagram illustrating an example of an entire process of the image processing apparatus according to the present embodiment.

FIG. 8 is a sequence diagram illustrating an example of an entire process of the image processing apparatus according to the present embodiment. Meanwhile, in FIG. 8, the same processes as that in FIGS. 4A and 4B will be explained with the same reference numerals.

Example of Process of Transitioning into a Valid State (Step S01)

In step S01, the microcomputer 92 performs a process of transitioning into a valid state.

Example of Storing a First Valid Data Value and a Second Valid Data Value (Step S02)

In step S02, the microcomputer 92 stores a first valid data value and a second valid data value, respectively.

Example of Determining Whether to Receive a Magic Packet (Step S03)

In step S03, the microcomputer 92 determines whether to receive a magic packet by the network I/F 91 (See FIG. 2). Specifically, in a case where the image processing apparatus is in the valid state ES, upon receiving the magic packet from the PC (See FIG. 1) or the like via the network 3 (See FIG. 1) ("in a case where it is determined that a magic packet is received in step S03"), the process of the microcomputer 92 proceeds to step S04. On the other hand, in a case of not receiving a magic packet from the network 3, the process of the microcomputer 92 repeats step S03.

Example of Start Up of Hardware, Programs and the Like (Step S04)

In step S04, the microcomputer 92 starts up hardware, program(s) and the like. That is, in step S04, in order to perform image processing and prepare for image processing, the microcomputer 92 starts up the engine 90 (See FIG. 2), which is used for the image processing and the preparation for image processing, the application program 103 (See FIG. 3), the engine program 104 or the like. Meanwhile, FIG. 8 illustrates an example where the microcomputer 92 starts up the hardware such as the engine 90, the service program 102 and the like, via the OS 101.

In the following, an example of the process in a case where a supply cable is connected to an electrical outlet will be explained.

Example of Determining Whether a First Valid Data Value Indicates a Valid State and Whether a First Valid Data Value and a Second Valid Data Value are Different (Step S10)

In step S10, at first, the microcomputer 92 determines whether the first valid data value indicates the valid state ES. Specifically, in a case where the first valid data value is "1", the microcomputer 92 determines that the first valid data value indicates the valid state ES. Moreover, in a case where it is determined that the first valid data value indicates the valid state ES, the microcomputer 92 then determines whether the first valid data value and the second valid data value are different from each other.

In a case where it is determined that the first valid data value indicates the valid state ES and the first valid data value and the second valid data value are different from each other ("in a case where it is determined that first valid data value indicates a valid state and a first valid data value and a second valid data value are different in step S10"), the process of the microcomputer 92 proceeds to step S11. On the other hand, in a case where the first valid data value is not "1", the microcomputer 92 ends the process. Similarly, even when the first valid data value is "1", in a case where the first valid data value and the second valid data value are not different from each other, the microcomputer 92 ends the process.

Example of Restricting a Second Electric Power (Step S11)

In step S11, the microcomputer 92 restricts the second electric power. Meanwhile, FIG. 8 illustrates an example of the microcomputer 92 restricting the second electric power supplied to the engine 90 or the like via the OS 101.

Example of a Process Such as the Setting of Wake-on-LAN (Step S12)

In step S12, the microcomputer 92 performs setting or the like of the Wake-on-LAN. Specifically, in step S12, the setting or the like of the Wake-on-LAN is performed and the image processing apparatus enters the valid state ES.

Example of Functional Configuration

Figure 9:
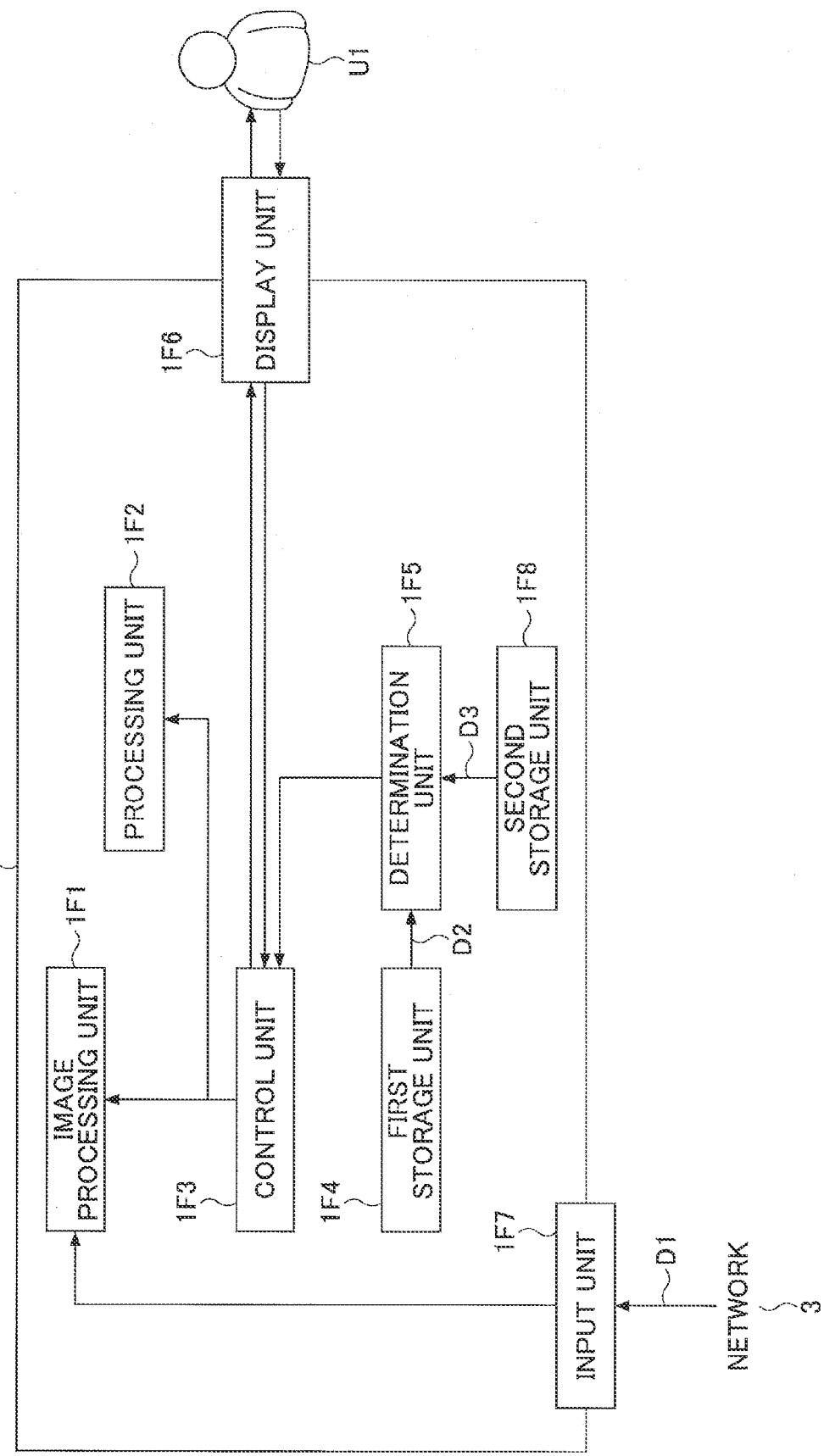
FIG. 9 is a functional block diagram illustrating an example of a functional configuration of the image processing apparatus according to the present embodiment.

FIG. 9 is a functional block diagram illustrating an example of a functional configuration of the image processing apparatus according to the present embodiment. Specifically, the image processing apparatus 1 includes an image processing unit 1F1, a processing unit 1F2, a control unit 1F3, a first storage unit 1F4, a determination unit 1F5, a display unit 1F6, an input unit 1F7 and a second storage unit 1F8.

The image processing unit 1F1 performs image processing for an image input into the image processing apparatus 1. Moreover, the image processing unit 1F1 is realized, for example, by the engine 90 (See FIG. 2) or the like.

The processing unit 1F2 performs, for example, initialization of parameters used in image processing by the image processing unit 1F1 and acquisition of data based on the first program. Moreover, the processing unit 1F2 generates, for example, an image displaying a state of the image processing apparatus 1, which is displayed by the display unit based on the second program. Furthermore, the processing unit 1F2 generates a screen showing settings related to the image processing, which is displayed by the display unit based on the second program, i.e. an image of a so-called "setting screen". Meanwhile, the processing unit 1F2 is, for example, realized by the CPU 10 (See FIG. 2) or the like.

The control unit 1F3 restricts the second electric power 6 (See FIG. 2) being supplied to the image processing unit 1F1, in a case where the determination unit 1F5 determines that the first valid data value D2 indicates a valid state and the first valid data value D2 and the second valid data value D3 are different from each other. Moreover, the control unit 1F3 is realized, for example, by the microcomputer 92 (See FIG. 2) or the like.

The first storage unit 1F4 stores the first valid data value D2. Meanwhile, in a case where the image processing apparatus 1 is in the valid state ES (See FIG. 4A), the first valid data value D2 stored in the first storage unit 1F4 becomes data indicating a valid state. Moreover, the first storage unit 1F4 is realized, for example, by the storage device 921 (See FIG. 2) or the like.

The second storage unit 1F8 stores the second valid data value D3. Meanwhile, in a case where the image processing apparatus 1 is in the valid state ES (See FIG. 4A), the second valid data value D3 stored in the second storage unit 1F8 becomes a data value indicating a valid state. Furthermore, when a power outage or the like occurs, the second valid data value D3 is erased, and a default value or the like is input in the second valid data value D3 upon the image processing apparatus starting or the like. Moreover, the second storage unit 1F8 is realized, for example, by the RAM 922 (See FIG. 2) or the like.

In a case where the first electric power 4 (See FIG. 2) is supplied to the image processing apparatus by a supply cable connected to the electrical outlet or the like, the determination unit 1F5 determines whether the first valid data value D2 indicates a valid state and whether the first valid data value D2 and the second valid data value D3 are different from each other. Moreover, the determination unit 1F5 is realized, for example, by the microcomputer 92 or the like.

The display unit 1F6 displays a screen showing the state of the image processing apparatus 1, and notifies a user U1 of the state of the image processing apparatus 1. Moreover, the display unit 1F6 displays a screen showing a setting related to image processing by the image processing unit 1F1, and causes the user U1 to perform various settings related to the image processing.

Furthermore, when the control unit 1F3 restricts the second electric power 6, the display unit 1F6 displays a screen showing that the second electric power 6 is restricted, and notifies the user U1 of the state of the image processing apparatus 1. Moreover, the display unit 1F6 may receive, through the GUI or the like, an operation by the user U1 instructing the supply of the second electric power. Meanwhile, upon the display unit 1F6 receiving the instruction to supply the second electric power 6, the control unit 1F3 supplies the second electric power 6, and the image processing apparatus 1 performs image processing, preparation for image processing or the like. Moreover, the display unit 1F6 is realized, for example, by the LCD 60 (See FIG. 2) or the like.

The input unit 1F7 inputs a start-up instruction, such as a magic packet D1 for starting up the image processing unit 1F1 or the like, via the network 3. That is, the start-up instruction, such as the magic packet D1, is received by the input unit 1F7. Moreover, the input unit 1F7 is realized, for example, by the network I/F 91 (See FIG. 2), the microcomputer 92 and the like.

In a case where the image processing apparatus 1 is in the valid state ES (See FIG. 4B), in which the image processing apparatus 1 can receive the start-up instruction of the magic packet D1, the first storage unit 1F4 and the second storage unit 1F8 store the first valid data value D2 and the second valid data value D3, which show the valid state ES, respectively. Next, when a power outage or the like occurs in the valid state ES, the first electric power 4 (See FIG. 2) may not be supplied to the image processing apparatus 1. In this case, the first valid data value D2 is maintained, and the second valid data value D3 is erased.

Next, upon the electric power being recovered, the second valid data value D3 is initialized. Furthermore, in a case where the electric power is recovered and the first electric power 4 is supplied to the image processing apparatus 1, the determination unit 1F5 determines whether the first valid data value D2 indicates the valid state ES and whether the first valid data value D2 and the second valid data value D3 are different from each other.

That is, in a case where the determination unit 1F5 determines that the first valid data value D2 indicates the valid state ES and the first valid data value D2 and the second valid data value D3 are different from each other, when a power outage or the like occurs in the valid state ES, it is preferable to enter the valid state ES again. Therefore, the image processing apparatus 1 starts setting the Wake-on-LAN or the like. Meanwhile, the process of setting or the like of the Wake-on-LAN by the image processing apparatus 1 is, for example, the process in step S12 shown in FIG. 4B.

In this case, since the process in step S12 is a process of entering into the valid state ES, hardware and programs which are not used for the setting or the like of the Wake-on-LAN are preferably restricted so as to reduce power consumption. Therefore, the image processing apparatus 1 restricts the second electric power 6 (See FIG. 2) in step S11 shown in FIG. 4B. In this way, the image processing apparatus 1 can reduce the power consumption related to the setting or the like of the Wake-on-LAN by restricting the second electric power 6 in step S11.

Example of the Results of the Process

Figure 10:
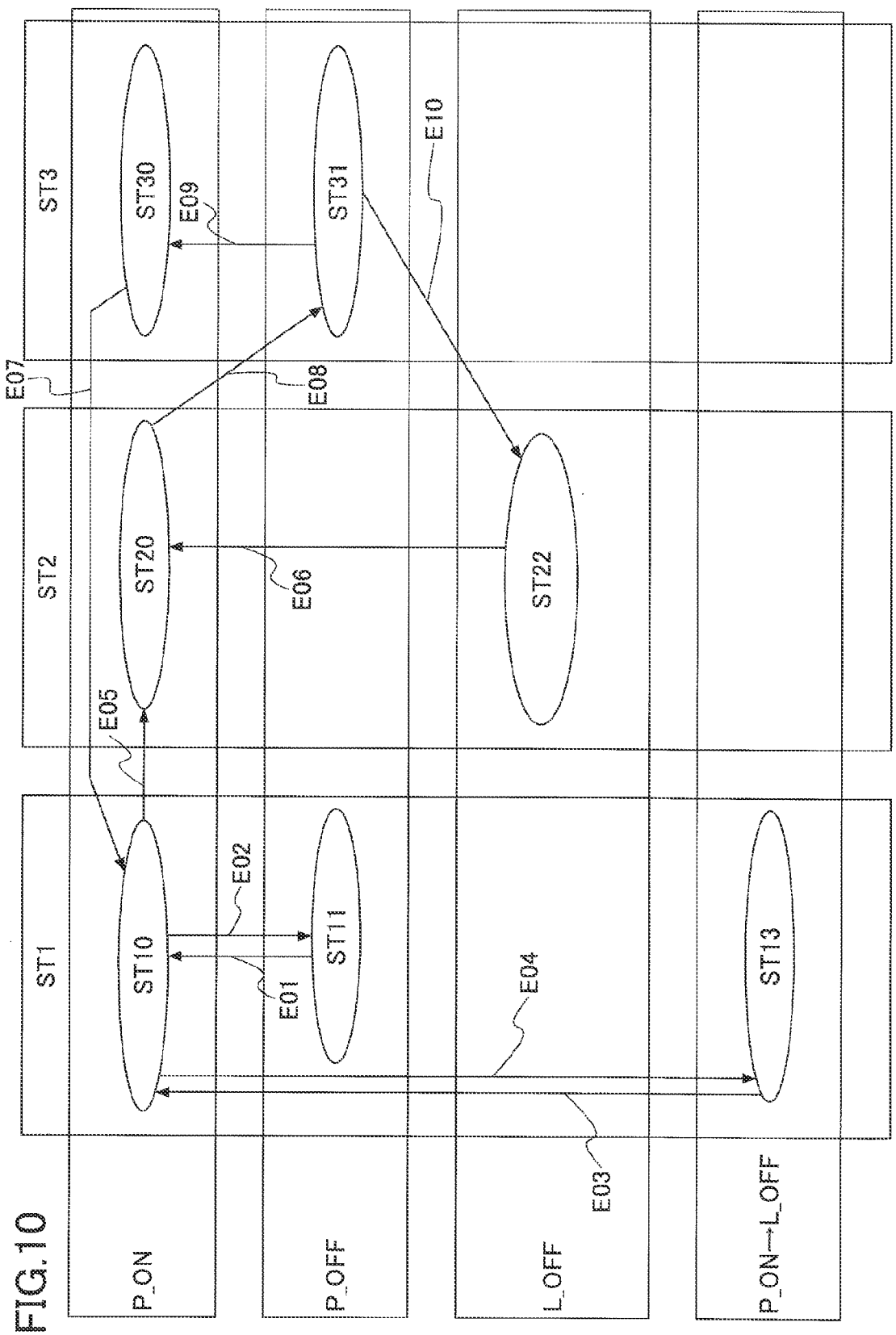
FIG. 10 is a state transition diagram illustrating an example of transitional states of the image processing apparatus according to the present embodiment.

FIG. 10 is a state transition diagram illustrating an example of transitional states of the image processing apparatus according to the present embodiment. Specifically, in FIG. 10, "ST1", "ST2" and "ST3" indicate states related to the Wake-on-LAN of the image processing apparatus. On the other hand, "P_ON", "P_OFF", "L_OFF" and "P_ON→L_OFF" indicate states related to the power source and the supply cable of the image processing apparatus.

In state "ST1", the setting of the Wake-on-LAN has not been performed in the image processing apparatus, and the image processing apparatus is not in a valid state (hereinafter referred to as "invalid state").

In state "ST2", the setting of the Wake-on-LAN is being performed in the image processing apparatus.

In state "ST3", the setting of the Wake-on-LAN in the image processing apparatus is completed. The image processing apparatus is in a valid state.

In state "P_ON", the second electric power (See FIG. 2) is supplied. That is, in state "P_ON", the image processing apparatus is powered on.

In state "P_OFF", the second electric power 6 is restricted.

In state "L_OFF", the image processing apparatus is not connected to the electrical outlet 5 (See FIG. 1) by the supply cable. That is, in state "L_OFF", the first electric power 4 (See FIG. 2) is not supplied to the image processing apparatus.

State "P_ON→L_OFF" is a state of a power outage or the like which occurs in state "P_ON". That is, in state "P_ON→L_OFF", the first electric power 4 (See FIG. 2) is not supplied to the image processing apparatus.

Upon an occurrence of an event, such as a user's operation or a power outage or the like, the state of the image processing apparatus transitions depending on the event and the state in which the event occurs.

At first, upon the supply cable being connected to the electrical outlet 5, the image processing apparatus is brought into state "ST11". Meanwhile, state "ST11" is state "P_OFF" and state "ST1". When an event E01 occurs in state "ST11", the state of the image processing apparatus transitions to state "ST10". Moreover, the event E01 is, for example, a user's operation of pressing the power switch so as to turn on the power or the like. On the other hand, when an event E02 occurs in state "ST10", the state of the image processing apparatus transitions to state "ST11". Meanwhile, the event E02 is, for example, a user's operation of pressing the power switch so as to turn off the power or the like.

Moreover, state "ST10" is state "P_ON" and state "ST1". When an event E05 occurs in state "ST10", the state of the image processing apparatus transitions to state "ST20". Meanwhile, the event E05 is, for example, a user's input operation so as to bring the image processing apparatus into a valid state or the like. Furthermore, when an event E04 occurs in state "ST10", the state of the image processing apparatus transitions to state "ST13". Meanwhile, the event E04 is, for example, a power outage or the like. Moreover, when an event E03 occurs in state "ST13", the state of the image processing apparatus transitions to state "ST10". Meanwhile, the event E03 is, for example, a recovery from the power outage or the like, an operation of connecting the supply cable to the electrical outlet or the like.

State "ST20" is state "P_ON" and state "ST2". Moreover, in a case where the state of the image processing apparatus transitions from "ST10" to "ST20" by the event E05, the process in step S01 shown in FIG. 4A is performed in state "ST20". Next, when an event E08 occurs in state "ST20", the state of the image processing apparatus transitions to state "ST31". Meanwhile, the event E08 is, for example, completion of the process in step S01.

State "ST31" is state "P_OFF" and state "ST3". Moreover, when an event E09 occurs in state "ST31", the state of the image processing apparatus transitions to state "ST30". Meanwhile, the event E09 is, for example, a reception of the magic packet or the like. That is, state "ST31" is an example of the valid state ES shown in FIG. 4A.

That is, when the power of the image processing apparatus is turned on, the state of the image processing apparatus transitions from state "ST11" to state "ST10". Furthermore, when an operation or the like for bringing the image processing apparatus into a valid state is performed in state "ST10", the state of the image processing apparatus transitions from state "ST10" to state "ST31" via state "ST20".

Next, the image processing apparatus is brought into state "ST30" by the event E09. State "ST30" is state "P_ON" and state "ST3". Moreover, in state "ST30", the image processing apparatus performs, for example, the process in step S04 shown in FIG. 4A. Furthermore, when an event E07 occurs in state "ST30", the state of the image processing apparatus transitions to state "ST10". Meanwhile, the event E07 is, for example, completion of the process in step S04.

That is, upon receiving the magic packet in the valid state ES, the state of the image processing apparatus transitions from state "ST31" to state "ST10", in which image formation or the like can be performed, via state "ST30", in which the process in step S04 for starting up hardware or the like is performed.

On the other hand, when an event E10 occurs in state "ST31", the state of the image processing apparatus transitions to state "ST22". Meanwhile, the event E10 is, for example, a power outage or the like.

State "ST22" is state "L_OFF" and state "ST2". Moreover, when an event E06 occurs in state "ST22", the state of the image processing apparatus transitions to state "ST20". Meanwhile, when the event E06 is, for example, a recovery from the power outage or the like, an operation of connecting the supply cable to the electrical outlet or the like.

In states "ST22" and "ST20", the image processing apparatus performs the processing shown in FIG. 4B. In a case of transitioning from state "ST22" to state "ST20", since a previous state of state "ST22" is state "ST31", the first valid data value D2 (See FIG. 9) indicates a valid state. On the other hand, the second valid data value D3 (See FIG. 9) is erased by the event E10. Upon the event E06 occurring, the second valid data value D3 is initialized. Therefore, in the process shown in FIG. 4B, it is determined that the first valid data value D2 indicates a valid state and the first valid data value D2 and the second valid data value D3 are different from each other (step S10 in FIG. 4B: YES), and the image processing apparatus performs the process in step S11 (See FIG. 4B) for restricting the second electric power. Next, in state "ST20", the image processing apparatus performs the process in step S12 shown in FIG. 4B for performing a setting so that the image processing apparatus is brought into a valid state. Therefore, since the second electric power is restricted by the process in step S11 before transitioning to state "ST20", power consumption by the image processing apparatus for performing the process in step S12 in state "ST20" can be reduced. Accordingly, power consumption for bringing the image processing apparatus into state "ST31", which is the valid state ES, can be reduced.

Example of a First Valid Data Value and a Second Valid Data Value

The first valid data value and the second valid data value in the respective states shown in FIG. 10 are, for example, shown as follows (in Table 1). Meanwhile, in the following (Table 1) the first valid data value and the second valid data value are assumed to be flag data values. That is, a "valid state" is represented by "1" and an "invalid state" is represented by "0". Moreover, default values of the first valid data value and the second valid data value are assumed to be "0".

TABLE 1

|  | ST10 | ST11 | ST13 | ST20 | ST22 | ST30 | ST31 |
|---|---|---|---|---|---|---|---|
| First valid data value | 0 | 0 | 0 | 1 | 1 | 1 | 1 |
| Second valid data value | 0 | 0 | 0 | 0 | 0 | 1 | 1 |

As shown above (Table 1), in each of states "ST10", "ST11", "ST13", "ST30" and "ST31", the first valid data value and the second valid data value are updated simultaneously. Therefore, the first valid data value and the second valid data value are the same. On the other hand, in each of the states "ST20" and "ST22", the first valid data value and the second valid data value are different from each other.

At first, when the image processing apparatus is brought into state "ST31", i.e. a valid state by the process in step S01 or the like, the first valid data value and the second valid data value become "1", respectively. In a case where a power outage or the like occurs in this state (event E10 in FIG. 10), the second valid data value of "1" is erased and becomes "0" which is the default value, since the second valid data value is stored in a volatile storage element. On the other hand, even when the power outage or the like occurs, the first valid data value of "1" is maintained, since the first valid data value is stored in a non-volatile storage element. Accordingly, in each of states "ST20" and "ST22", the first valid data value is "1" which indicates the state before the power outage or the like, and the second valid data value is "0" after the initialization.

In this way, in a case where the first valid data value is "1" and the second valid data value is "0", the image processing apparatus determines that a state before the power outage or the like is a valid state such as "ST31". Accordingly, in step S10 (See FIG. 4B), at first, the image processing apparatus determines whether the first valid data value is "1". Furthermore, in a case where the first valid data value is "1", it is determined whether the first valid data value and the second valid data value are different from each other.

In this way, the image processing apparatus determines whether it is a state where the image processing apparatus restarted after an occurrence of a power outage or the like.

In an image processing apparatus according to the related art, even in a case of setting Wake-on-LAN or the like, electric power is supplied to the image processing apparatus, and an application program and an engine which are not used for setting the Wake-on-LAN are activated. In this way, due to the electric power used for starting up the application program and the engine, power consumption related to the setting of the Wake-on-LAN may become greater.

On the other hand, according to the embodiment of the present application, power consumption related to setting Wake-on-LAN or the like can be reduced.

Meanwhile, all of or a part of the respective processes may be realized by an execution of a program, which is described by a legacy programming language, an object-oriented programming language or the like, such as assembler, C, C++, C# or Java (trademark registered). That is, the program is a computer program for causing a computer such as an image processing apparatus to execute the respective processes.

Moreover, the program may be stored in a computer-readable recording medium such as a ROM or an EEPROM (Electrically Erasable Programmable ROM) and distributed. Furthermore, the recording medium may be an EPROM (Erasable Programmable ROM), a flash memory, a flexible disk, a CD-ROM (Compact Disc ROM), a CD-RW (CD-ReWritable), a DVD-ROM (Digital Versatile Disc ROM), a DVD-RW (DVD ReWritable), a Blu-ray Disc, a SD (Secure Digital) card (trademark registered), a MO (Magneto Optical) disk or the like. Furthermore, the program may be distributed via a telecommunication line.

Further, the present invention is not limited to these embodiments, but various variations and modifications may be made without departing from the scope of the present invention.

The present application is based on and claims the benefit of priority of Japanese Priority Applications No. 2014-118959 filed on Jun. 9, 2014 and No. 2015-052484 filed on Mar. 16, 2015, the entire contents of which are hereby incorporated by reference.

What is claimed is:

1. An image processing apparatus, which is connected to a network and processes an image, comprising:
   an image processing unit configured to perform an image processing for the image;
   an input unit configured to input a start-up instruction to start up the image processing unit via the network;
   a detection unit configured to detect that a first electric power is supplied to the image processing apparatus in a case where a supply cable, which supplies the first electric power to the image processing apparatus, is connected to an electrical outlet in a state that the supply cable is separated from the electrical outlet;
   a first storage unit, which is non-volatile, configured to store a first valid data indicating whether being in a valid state which is a state capable of accepting the start-up instruction;
   a second storage unit, which is volatile, configured to store a second valid data indicating whether being in the valid state;
   a determination unit configured to perform determination whether the first valid data is a data which indicates the valid state and determination whether the first valid data and the second valid data are different from each other upon detecting by the detection unit that the first electric power is supplied;
   a control unit configured to restrict a second electric power of the first electric power being supplied to the image processing unit, in a case where the first valid data is determined to be a data which indicates the valid state and the first valid data and the second valid data are determined to be different from each other, to perform settings so as to bring into the valid state upon the second electric power being restricted, and to bring the image processing apparatus into the valid state;

a display unit configured to display a screen showing a state of the image processing apparatus or a setting related to the image processing; and a processing unit configured to perform processing based on a second program for executing a process of generating an image which is displayed on the screen, wherein the control unit is configured to restrict execution of the second program in a case where the first valid data is determined to be a data which indicates the valid state and the first valid data and the second valid data are determined to be different from each other.

2. The image processing apparatus as claimed in claim 1 wherein the control unit is configured to restrict a third electric power of the first electric power, being supplied to a peripheral device connected to the image processing apparatus, in a case where the first valid data is determined to be a data which indicates the valid state and the first valid data and the second valid data are determined to be different from each other.

3. The image processing apparatus as claimed in claim 1 further comprising a processing unit configured to perform processing based on a first program for executing a process of initializing a parameter used for the image processing or acquiring data used for the image processing, wherein the control unit is configured to restrict execution of the first program in a case where the first valid data is determined to be a data which indicates the valid state and the first valid data and the second valid data are determined to be different from each other.

4. The image processing apparatus as claimed in claim 1 further comprising a display unit configured to display a screen indicating that the second electric power is restricted upon the control unit restricting the second electric power.

5. The image processing apparatus as claimed in claim 4 wherein the display unit is configured to receive an operation of performing instruction to supply the second electric power, and the second electric power is supplied upon the operation being received.

6. The image processing apparatus as claimed in claim 1 wherein the valid state is a state where the image processing apparatus is shut down.

7. A control method performed by an image processing apparatus, which is connected to a network and includes an image processing unit for performing an image processing for an image, a first storage unit, which is non-volatile, a second storage unit, which is volatile, a display unit and a processing unit, the method comprising:

inputting, by the image processing apparatus, a start-up instruction to start up the image processing unit via the network;

detecting, by the image processing apparatus, that a first electric power is supplied to the image processing apparatus in a case where a supply cable, which supplies the first electric power to the image processing apparatus, is connected to an electrical outlet in a state that the supply cable is separated from the electrical outlet;

storing, by the image processing apparatus, a first valid data indicating whether being in a valid state which is a state capable of accepting the start-up instruction in the first storage unit;

storing, by the image processing apparatus, a second valid data indicating whether being in the valid state in the second storage unit;

performing, by the image processing apparatus, determination whether the first valid data is a data which indicates the valid state and determination whether the first valid data and the second valid data are different from each other upon detecting that the first electric power is supplied;

restricting, by the image processing apparatus, a second electric power of the first electric power being supplied to the image processing unit, in a case where the first valid data is determined to be a data which indicates the valid state and the first valid data and the second valid data are determined to be different from each other, performing settings so as to bring into the valid state upon the second electric power being restricted, and bringing the image processing apparatus into the valid state;

displaying a screen on the display unit showing a state of the image processing apparatus or a setting related to the image processing; and performing processing, by the processing unit, based on a second program for executing a process of generating an image which is displayed on the screen, and restricting execution of the second program in a case where the first valid data is determined to be a data which indicates the valid state and the first valid data and the second valid data are determined to be different from each other.

8. A non-transitory computer-readable storage medium storing a program for causing a computer connected to a network and including an image processing unit for performing an image processing for an image, a first storage unit, which is non-volatile, a second storage unit, which is volatile, to execute control, a display unit and a processing unit, the process comprising:

an input step, by the computer, of inputting a start-up instruction to start up the image processing unit via the network;

a detection step, by the computer, of detecting that a first electric power is supplied to the computer in a case where a supply cable, which supplies the first electric power to the image processing apparatus, is connected to an electrical outlet in a state that the supply cable is separated from the electrical outlet;

a first storage step, by the computer, of storing a first valid data indicating whether being in a valid state which is a state capable of accepting the start-up instruction in the first storage unit;

a second storage step, by the computer, of storing a second valid data indicating whether being in the valid state in the second storage unit;

a determination step, by the computer, of performing determination whether the first valid data is a data which indicates the valid state, and determination whether the first valid data and the second valid data are different from each other upon detecting that the first electric power is supplied;

a control step, by the computer, of restricting a second electric power of the first electric power being supplied to the image processing unit, in a case where the first valid data is determined to be a data which indicates the valid state and the first valid data and the second valid data are determined to be different from each other, performing settings so as to bring into the valid state upon the second electric power being restricted, and bringing the image processing apparatus into the valid state;

displaying a screen on the display unit showing a state of the image processing apparatus or a setting related to the image processing; and performing processing, by the processing unit, based on a second program for executing a process of generating an image which is displayed on the screen, and restricting execution of the second program in a case where the first valid data is determined to be a data which indicates the valid state and the first valid data and the second valid data are determined to be different from each other.

\* \* \* \* \*